United States Patent Office 3,467,874
Patented Sept. 16, 1969

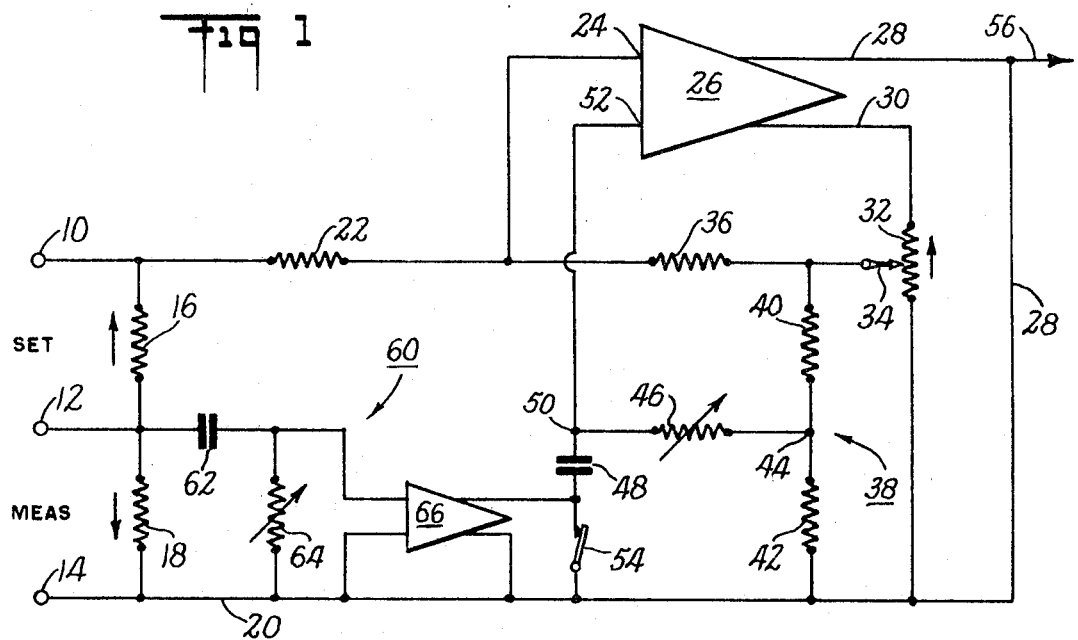
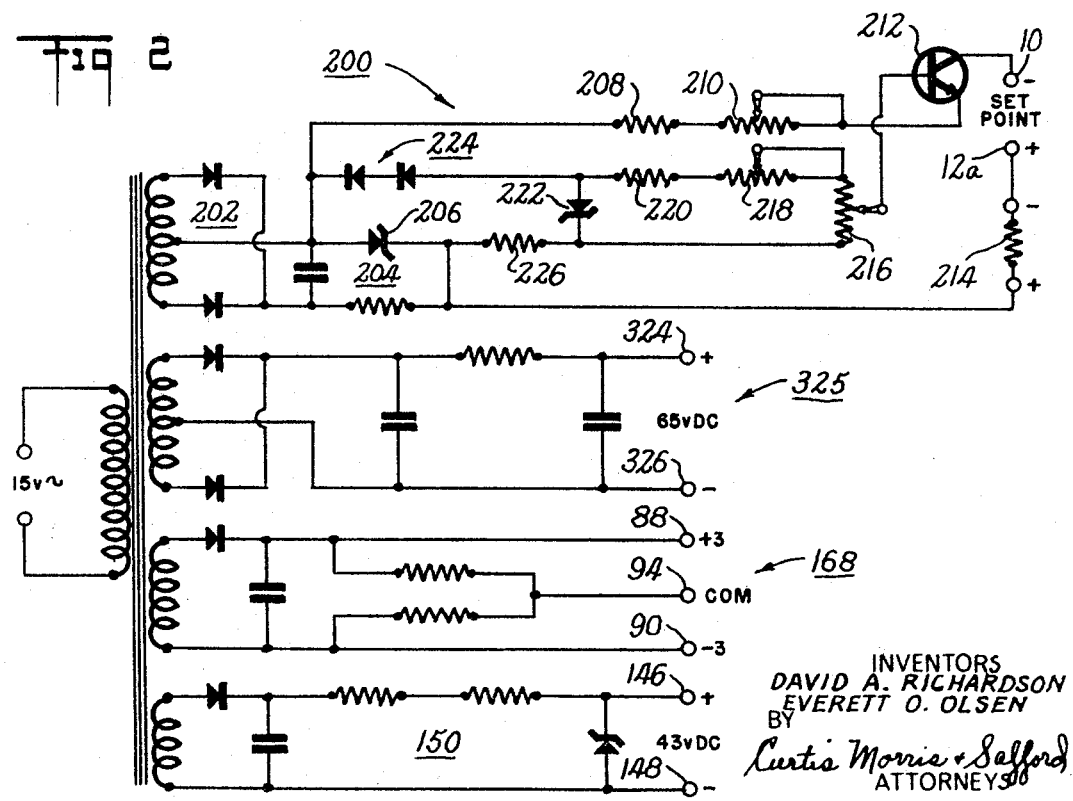

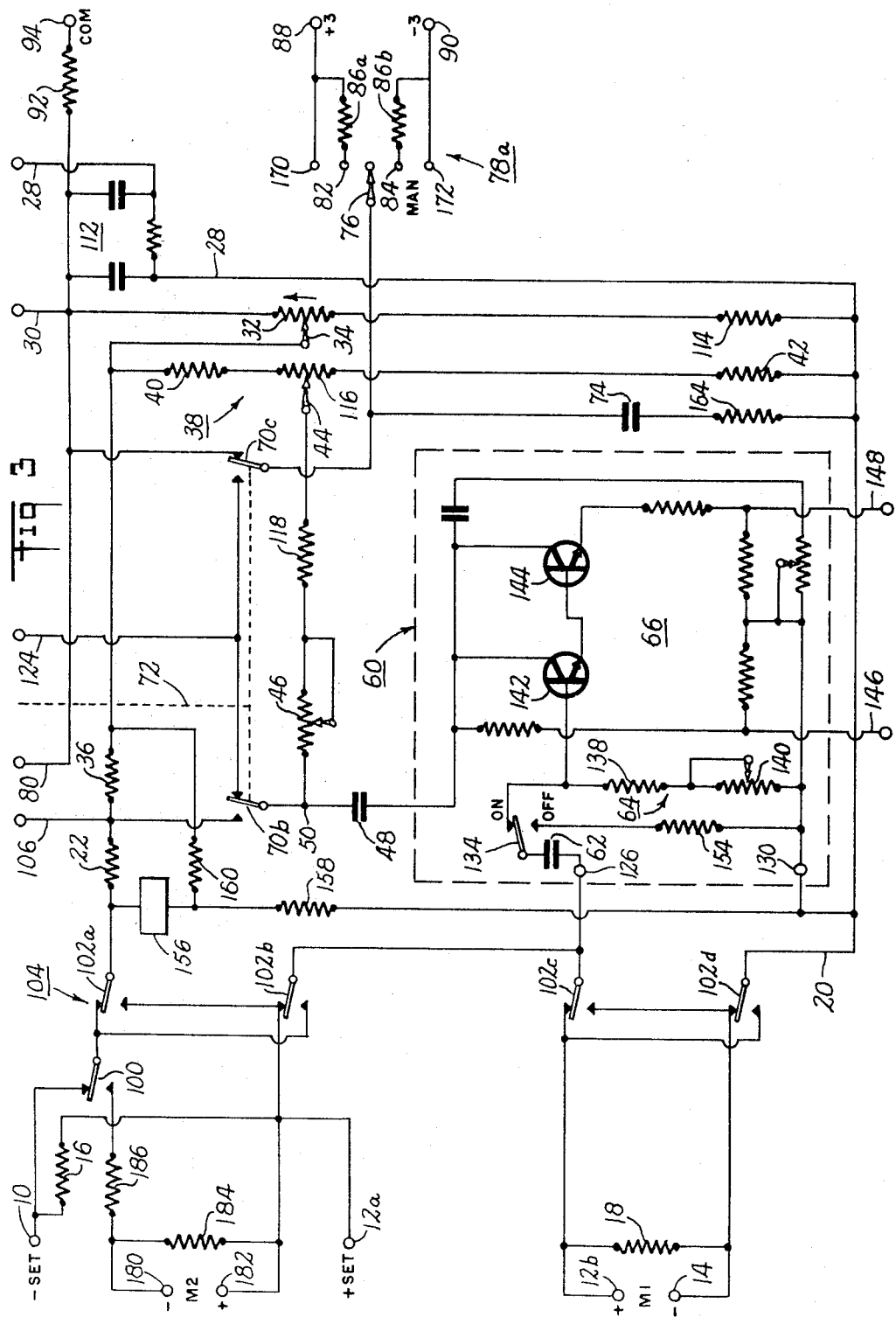

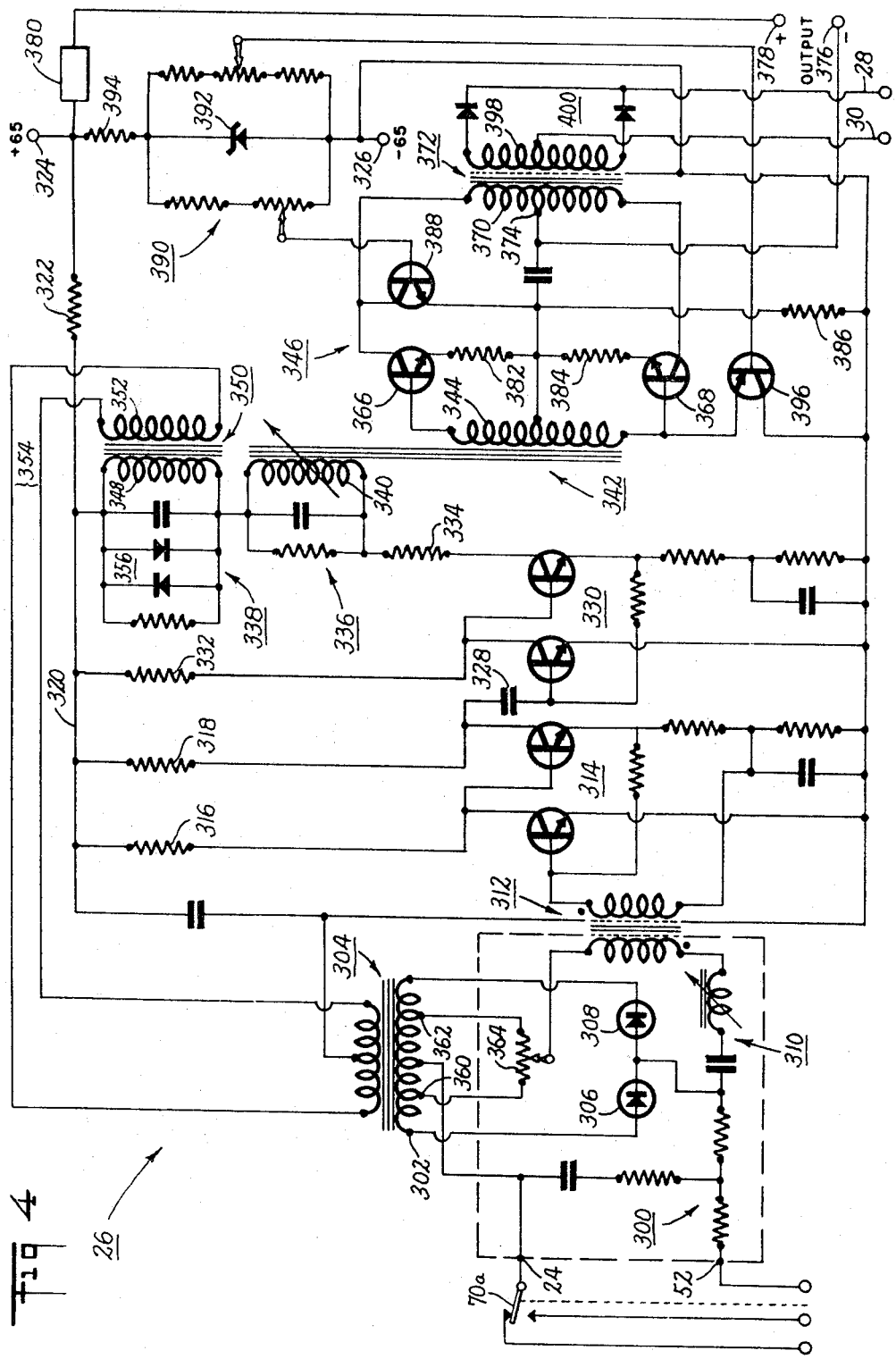

3,467,874
SOLID STATE PROCESS CONTROLLER PROVIDING TIME-VARIANT EFFECTS
David A. Richardson, Sheldonville, and Everett O. Olsen, Wrentham, Mass., assignors to The Foxboro Company, Foxboro, Mass., a corporation of Massachusetts
Filed Nov. 15, 1965, Ser. No. 507,765
Int. Cl. H03k 5/00; H03f 3/68
U.S. Cl. 328—1         19 Claims

ABSTRACT OF THE DISCLOSURE

A solid-state electronic controller for maintaining constant a condition of an industrial process and having means for providing time-variant effects of the reset and rate type, the controller including a high gain amplifier to which is directed a deviation signal responsive to the difference between a measured process condition and the desired value thereof, the controller being provided with feedback means for developing a feedback voltage corresponding to the amplifier output, and further including means for directing feedback signals to the amplifier input circuit, one feedback signal being coupled to one input terminal through a purely resistive path, the other feedback signal being coupled through an RC network to the other input terminal.

---

This invention relates to control apparatus for use in regulating a variable condition of an industrial process. More particularly, this invention relates to electronic control apparatus of the type adapted to receive an electrical measurement signal and to produce a corresponding electrical control signal for transmission to a process regulating device such as a valve or the like.

Electronic process controllers of the so-called "analog" type have been available and in use commercially for a number of years. One particularly succesful design is disclosed in U.S. Patent No. 2,956,234 isued to E. O. Olsen on Oct. 11, 1960. One important advantage of such prior controllers is that they are constructed of modern "solid state" components comprising transistors and other elements made of semiconducting material, and thus not only provide excellent control characteristics but are able to operate reliably for long periods of time.

Experience over the years with currently available controllers has indicated the need for improvement in certain respects, and it is a principal object of this invention to provide such improved apparatus. As an embodiment of this invention, there is disclosed a controller having a number of advantages. For example, this controller has a relatively low A-C impedance between its input terminals and circuit-ground, thus enhancing stability and permitting the use of very high gains. Also, the rate-responsive circuitry of this controller is effectively isolated from the set-point signal, so that any change in set point does not have an amplifier effect on the control signal as it does in certain prior controllers. The controller described herein also includes improved rate-responsive characteristics particularly suited for applications where there are relatively long time lags in the process. Other aspects and advantages of the new controller will in part be pointed out in, and in part apparent from, the following description considered together with the accompanying drawings, in which:

FIGURE 1 is a simplified schematic diagram illustrating the input and feedback circuitry of a process controller constructed in accordance with the present invention;

FIGURE 2 shows details of the power supply circuitry including the set point signal generating means; and FIGURES 3 and 4 together form a schematic diagram showing the details of the process controller of FIGURE 1.

Referring now to the left-hand side of FIGURE 1, there are shown three input terminals 10, 12 and 14 leading to two series-connected resistors 16 and 18. Through the circuit loop including terminals 10 and 12 and resistor 16 (500 ohms) flows a set point current of adjustable but normally fixed magnitude, for example in the range of 2 to 10 milliamps. Through the other circuit loop including terminals 12 and 14 and resistor 18 (100 ohms) flows a measurement current, e.g. in the range of 10 to 50 milliamps, and having a magnitude proportional to the value of the controlled process condition. These two currents are in opposite directions, as shown by the arrows, and thus the voltages produced across the resistors 16 and 18 are of opposite polarity.

The circuitry described thus far comprises comparison circuit means arranged to produce between terminals 10 and 14 a deviation signal having a magnitude proportional to the difference between the desired and actual values of the process condition, and having a polarity determined by whether the condition is above or below the desired value. When the measured process condition is exactly at its desired value, i.e. on "set point," the deviation signal will be zero. If the measurement current through resistor 18 changes, the potential of terminal 10 will change correspondingly with respect to that of terminal 14. Simply to provide a base of reference for the various circuit potentials in the controller, terminal 14 will be considered the "circuit ground," and the lead 20 connected thereto will be termed the "reference lead." If the set point current through resistor 16 is adjusted to its mid-value (6 milliamps), the deviation signal at terminal 10 can be at any potential from minus 2 volts to plus 2 volts with respect to reference lead 20, the exact value depending of course upon the measured process condition.

The deviation signal on terminal 10 is directed through an input resistor 22 (100K) to one input terminal 24 of a high-gain D-C amplifier generally indicated at 26. This amplifier, which will be described hereinbelow in detail, may for example have a forward gain of 2,000. The output leads 28 and 30 of this amplifier are connected respectively to the ends of a potentiometer 32 (600 ohms) the lower end of which also is connected to the reference lead 20. The movable arm 34 of potentiometer 32 defines an output terminal 34 providing a feedback voltage. This voltage is applied to the input end of a first feedback circuit comprising a series resistor 36 (100K), the remote end of which is connected to the amplifier input terminal 24. The direction of current flow is "up" through potentiometer 32, so that the potential of terminal 34 is negative with respect to the reference lead 20.

It will be observed that resistors 22 and 36 form a voltage divider having a 2:1 dividing ratio. Since the amplifier 26 requires essentially no current at its input circuit (as will be evident from the detailed description hereinbelow), the current through resistors 22 and 36 will be equal and thus the potential of the intermediate point between these resistors will be mid-way between the potentials at the ends. For example, if the deviation signal on terminal 10 is zero and potentiometer 32 is adjusted to provide a potential of −3 volts on terminal 34, the potential of the amplifier input terminal 24 will be minus 1.5 volts, i.e. half-way between the potentials of deviation terminal 10 and terminal 34.

Output terminal 34 also is connected through a second voltage divider 38, consisting of two series resistors 40 and 42, to the reference lead 20. The intermediate point 44 of this second voltage divider supplies a signal to one end of a reset feedback circuit comprising an adjustable series reset resistor 46 (e.g. 100M) followed by a shunt reset capacitor 48. The junction 50 between resistor 46 and capacitor 48 is connected to the second amplifier input terminal 52, and the other plate of capacitor 48 is shown connected through a closed switch 54 back to the reference lead 20. As will be evident from the more detailed description hereinbelow respecting FIGURES 3 and 4, the switch 54 is not actually necessary, but is shown in FIGURE 1 to illustrate that the connection from the capacitor 48 to the reference lead 20 is of relatively low impedance.

The potential difference between the two amplifier input terminals 24 and 52 determines the magnitude of current flowing through output leads 28 and 30. Typically, with the potential difference between the input terminals zero, the output current is adjusted to be at its mid-range value, e.g. having a magnitude sufficient to create a drop of 9 volts across the potentiometer 32. As the amplifier output swings through its full range, the drop across the potentiometer varies from 3 to 15 volts. An increase in potential of the amplifier input terminal 24 causes the current flow through potentiometer 32 to increase, and vice-versa. The full range of output variation is obtained by a change in input voltage of about one millivolt.

The operation of the FIGURE 1 circuitry is as follows: assuming first that the deviation signal at terminal 10 is zero, and that all of the circuit potentials are stabilized, an increase in the measurement current through resistor 18 will create a positive deviation signal at terminal 10, and this will tend to raise the potential of amplifier input terminal 24. The output current flowing through potentiometer 32 thus will increase to cause the potential on output terminal 34 to go more negative. Capacitor 48 prevents any immediate change in the potential of amplifier input terminal 52, and the feedback action is represented initially by the effect of feedback resistor 36 on the other input terminal 24.

As an exaggerated example, if the measurement current through resistor 18 increases suddenly by 10 milliamps (e.g. from 30 to 40 milliamps), the potential of deviation terminal 10 would go positive one volt. Assuming now that the potential of the output terminal 34 was −3 volts initially, the one volt increase in the deviation signal will cause the potential of output terminal 34 to shift to a new more negative potential tending to keep the potential of input terminal 24 at its original value. It will be evident that this new lower potential must be −4 volts; that is, a one volt increase in the deviation signal requires a one volt decrease in the feedback potential at terminal 34, because with a 2:1 voltage dividing ratio provided by resistors 22 and 36, the potential of input terminal 24 can be held constant only if the potentials at the ends of the voltage divider vary an equal amount and in opposite directions. Of course, it is not possible to hold input terminal 24 exactly to its original potential, because there must be a change in the input voltage between terminals 24 and 52 to produce the increased amplifier output current required to shift the output potential at terminal 34 one volt. However, the amplifier gain is so high that this change in input potential is essentially negligible relative to the change in deviation signal and feedback voltage.

The amplifier 26 includes in its output a control signal circuit 56 which is symbolically indicated in FIGURE 1 as a single conductor connected to output lead 28. This circuit is adapted to transmit to a remote process regulating device, such as a valve or the like (not shown), a control signal corresponding to the current through potentiometer 32. In the actual controller detailed in FIGURES 3 and 4, this circuit 56 is somewhat more complex than that shown in FIGURE 1, but in essence it acts by a conventional manner to produce an output control signal in the range of 10–50 milliamps, whereas the current flowing through potentiometer 32 is in the range of 5–25 milliamps. Thus, when the deviation signal goes from zero to one volt, the control signal in circuit 56 initially will increase correspondingly.

After the initial change in the potential of the output terminal 34 has been effected, there will be a further and continuing change in the output due to the gradual change in the potential of the other amplifier input terminal 52 resulting from the charging (or discharging) of reset capacitor 48. Specifically, if the potential of output terminal 34 goes from −3 to −4 volts as described above, the potential of intermediate point 44 in the voltage divider 38 will shift from −1.5 volts to −2 volts, and capacitor 48 thus will begin charging up from a voltage level of −1.5 volts towards a level of −2 volts. Such decrease in potential of capacitor 48 in effect increases the voltage difference between the amplifier input terminals 24 and 52 thus tending correspondingly to increase the amplifier output current. This is the reset action required of modern controllers.

Of course, ordinarily the charging of reset capacitor 48 is at a relatively low rate, because of the large time-constant of reset resistor 46 and capacitor 48. This time-constant might be as high as 30 minutes for processes having relatively long time lags. Also, the initial change in the control signal in circuit 56 produces a corresponding change in the setting of the process regulating device, and this in turn causes the controlled process condition to start back to the desired set point. Thus the deviation signal at terminal 10 will correspondingly be reduced, which tends to counteract the increase in control current due to reset action. These various influences in the circuitry interact in a dynamic fashion, and produce as an end result a proper control action effective to stabilize the controlled process condition at the desired level with reasonable speed and minimum overshoot.

A significant advantage of the reset feedback arrangement described hereinabove is that the reset capacitor 48 is connected in shunt between the input of amplifier 26 and the reference lead 20. Because of this, the A-C impedance between the reference lead and the amplifier input is quite low, tending to reduce the effects of unwanted or stray currents on the operation of the amplifier. Such a low A-C input impedance for example makes it possible to utilize very high gain in the amplifier, to provide desirably close control and other benefits, without producing or approaching instability.

The setting of the potentiometer 32 determines the "proportioning band" of the controller, i.e. the magnitude of change of the controller output for a given change in deviation signal. Each change in potential of deviation signal terminal 10 will be matched by an equal and opposite change in potential of output terminal 34, but the corresponding change of current through leads 28 and 30 will depend upon the setting of potentiometer 32.

With the proportioning-band potentiometer 32 placed in the feedback circuit in a position preceding the reset resistor 46 and reset capacitor 48, the potentiometer may be a low impedance element, e.g. 600 ohms. This is a significant benefit because high-impedance elements not only are more expensive but generally introduce more difficult problems in obtaining satisfactory operation. The reset circuit described herein includes only one high-impedance element (resistor 46), and the impedance of this element is only one-half the impedance it would have in prior arrangements where the proportioning-band potentiometer was connected in shunt with the reset resistor.

For many processes, it is desirable also to have in the final control signal a component proportional to the rate-of-change of the measured condition. This is accomplished in the controller described herein by a rate-responsive circuit, generally indicated at 60, the input of which is connected directly across the measurement resistor 18. The rate-sensing elements of this circuit consist of a series capacitor 62 followed by an adjustable shunt resistance 64 (1M), which coact in a known manner to develop across resistance 64 a signal essentially proportional to the rate-of-change of the measurement signal produced by resistor 18. This rate signal is fed to the input of a D-C amplifier 66 having a gain of about five. The output of this amplifier is connected between the reset capacitor 48 and reference lead 20 so that, with shorting switch 54 open, the intensified rate signal from amplifier 66 is injected into the input of the main amplifier 26 in series with the reset feedback signal on capacitor 48.

One advantage of this rate circuit arrangement is that the rate-responsive elements are isolated from the set signal across resistor 16. Thus, although a change in set point will of course affect the control signal in circuit 56, the effect of set point change will not be intensified by the rate-responsive elements as it is in certain prior controllers, for example those wherein the rate signal is developed in a feedback circuit. In such prior controllers a change in set point could produce a severe upset of the process requiring considerable time to dissipate before stable operation can be reached at the new set point.

It should also be noted that the rate signal must pass through the reset capacitor 48 to reach the input of amplifier 26. Because of this, the leakage characteristics of the rate capacitor 62 are not especially critical. That is, the reset capacitor effectively isolates the rate circuit 60 from the input of amplifier 26, and the leakage characteristics of the reset capacitor typically will be quite good because of the need to prevent the development of any offset voltage in the amplifier input. Thus, the effects of any leakage through the rate capacitor 62 will be shielded from the input of amplifier 26.

The rate circuit 60 does not introduce any substantial A-C impedance between the reference lead 20 and the input of amplifier 26. In the particular rate circuit disclosed herein, to be described below in detail, the output circuit of the amplifier 66 appears as an impedance of about 30K in series with the amplified rate signal, so that the good A-C impedance characteristics provided by the shunt reset capacitor 48 are maintained.

Referring now to the left-hand side of FIGURE 3, the preferred embodiment of the present invention includes set point input terminals 10 and 12a through which the set point current is directed to resistor 16 to produce a corresponding set point voltage signal. This set point signal is coupled through a cascade switch 100 and one section 102a of a conventional reversing switch 104 to the input resistor 22. The other set signal terminal 12a is connected through two other sections 102b and 102c of the reversing switch to the measurement signal resistor 18 which is supplied with a measurement current from terminals 12b and 14. These latter terminals typically will be connected through a two-wire transmission line to a conventional measurement transmitter, such as one arranged to produce a current corresponding to a temperature of the process. The measurement voltage developed across resistor 18 is in series opposition to the set point voltage across resistor 16, so that these resistors and the associated circuitry form a comparison circuit. The difference between the two compared voltages represents the "deviation signal" which is proportional to the difference between the measured process condition and the desired value thereof.

The lower end of the comparison circuit defined by resistors 16 and 18 is connected through section 102d of the reversing switch 104 to circuit ground, provided by reference lead 20. The deviation signal at the upper end of the comparison circuit is coupled through input resistor 22 to a conductor 106 leading to input terminal 24 of amplifier 26 (the details of which are shown in FIGURE 4). The output current developed by this amplifier flows through output leads 28 and 30 and a filter 112 (in the upper right-hand corner in FIGURE 3). The filtered direct current produces a corresponding voltage drop across a series-connected load consisting of a fixed resistor 114 (10 ohms) and the potentiometer 32. The movable arm of potentiometer 32 defines an output terminal 34, and the voltage picked off is directed through feedback resistor 36 to the amplifier input lead 106. The feedback voltage on terminal 34 also is applied across the voltage-dividing network 38 consisting of resistors 40 and 42 (100K each) in series with a trimming potentiometer 116 (10K) the movable arm of which defines the intermediate point 44 of the divider 38. The feedback voltage on point 44 is directed through the series combination of fixed resistor 118 (390K) and the adjustable reset resistor 46 (100M) to the shunt reset capacitor 48 (18 microfarads). The upper plate of this reset capacitor is connected through one section 70b of the manual-to-automatic transfer switch 72 to a lead 124 extending to the other input terminal 52 (FIGURE 4) of the amplifier.

The measurement signal developed across resistor 18 also is fed to one input terminal 126 of a rate-responsive circuit generally indicated at 60. The other input terminal 130 of this circuit is connected to the reference lead 20. This circuit has an input comprising the series capacitor 62 (100 microfarads) connected through an on-off switch 134 to shunt resistance 64 consisting of a fixed resistor 138 (2.2K) in series with an adjustable resistor 140 (1M). If the measurement signal across resistor 18 is fixed, i.e. unchanging, there will be no voltage across the shunt resistance 64 because the capacitor 62 will be charged up to the voltage of the measurement signal. However, if the measurement signal is changing, there will be a voltage developed across the shunt resistance 64 proportional to the rate-of-change. The magnitude of this voltage is determined by the RC time-constant of the input circuit elements 62 and 64 and can be altered as desired by the adjustable resistor 140.

The rate-of-change voltage developed across the shunt resistance 64 is applied to amplifier 66 comprising direct-coupled transistors 142 and 144. This amplifier is supplied with operating power over two leads 146 and 148 which are connected to a conventional 43 volt D-C power supply 150 (see FIGURE 2). The output of amplifier 66 is biased up to provide a normal (zero-input) output potential on terminal 152 of about 20 volts. This output varies between about zero volt and 40 volts under operating conditions.

To eliminate rate action from the control signal, the on-off switch 134 is placed in its "off" position to connect a resistor 154 (10K) between rate capacitor 62 and reference lead 20. This assures that the capacitor 62 always remains charged to the level of the measurement signal across resistor 18, so that switchback to "on" position can be effected without disturbance to the process. The resistor 154 is provided to prevent deterioration of the controller response speed which otherwise would occur if the rate capacitor were connected directly across the measurement resistor.

To the left-hand end of input resistor 22 is connected a deviation meter 156 to provide an indication of the magnitude of the deviation signal. Since resistors 16 and 18 carry not only the set point and measurement currents but also a small additive current resulting from the feedback signal on terminal 34, it is not possible to get a reading of the deviation signal simply by connecting meter 156 directly across resistors 16 and 18. To compensate for this small additive current, the lower terminal of meter 156 is connected through a resistor 158 (600 ohms) to reference lead 20, and through another resistor 160 (200K) to terminal 34. The resulting voltage drop across resistor 158 exactly compensates for the additive voltage drop across resistors 16 and 18 due to the feedback signal, so that the deviation meter 156 reads only the actual deviation signal.

The upper end of potentiometer 32 is connected through section 70c of transfer switch 72 to one plate of memory capacitor 74 (2 microfarads) the remote plate of which is connected through a stabilizing resistor 164 (100K) to reference lead 20. The energized plate of capacitor 74 also is connected to the selector arm 76 of a 5-position switch 78a. In its normal center position, arm 76 is isolated from the operative switch contacts and thus the voltage of capacitor 74 always will follow exactly the output of amplifier 26 so as to maintain a "memory" of the control signal magnitude for subsequent use when the controller is switched from automatic to manual operation.

When the transfer switch 72 is shifted to "manual" position, section 70a of this switch (see FIGURE 4) disconnects lead 106 from amplifier input terminal 24, so that the amplifier input is isolated from the deviation signal. Simultaneously the memory capacitor 74 is connected to the input of the amplifier by section 70c of the transfer switch, for the purpose of fixing the controller output at the level just before switchover to manual. In this regard, since capacitor 74 is charged up to a level corresponding to the controller output, its potential is much too large to be applied directly as the sole input signal to the amplifier because the amplifier would immediately be driven to its limit. Such a result however is prevented by circuit means made operative when transfer switch 72 is shifted to manual position and arranged to compensate for the magnitude of the capacitor voltage so as to cause the amplifier output to be held at its previous level.

In the present embodiment this circuit means consists of a manual feedback lead 80 which is connected by transfer switch section 70a to amplifier input terminal 24 to apply thereto the potential of amplifier output lead 30. Thus, the amplifier output is automatically held at its previous level, because the feedback action of lead 80 causes the amplifier output to be at a level which maintains the potential of output lead 30 equal to the potential of capacitor 74, i.e. at the value which each had prior to switchover. Accordingly the transfer to manual is effected without any upset to the process. Thereafter, the feedback action of amplifier 26 tends to hold the original charge on capacitor 74, so as to minimize any drift effects over a period of time.

To adjust the controller output signal while on "manual" the operator merely shifts the switch 78a to either of two contacts 82 or 84, whereby the switch arm 76 is connected through respective charge-rate limiting resistors 86a and 86b (10M) to positive or negative supply voltages 88 and 90 (e.g. 3 volts), the circuit being completed through a resistor 92 and common terminal 94. Details of the corresponding power supply 168 are shown in FIG. 2. Current from supply voltage 88 or 90 gradually charges (or discharges) the capacitor 74 to a new level, and the output of the controller changes accordingly. To permit a very rapid change in capacitor charge, switch 78 is provided with additional contacts 170 and 172 which lead directly to the positive and negative voltages 88 and 90, without interposition of the charge-rate limiting resistors 86a and 86b.

While the controller is on "manual," section 70b of transfer switch 72 connects the upper plate of reset capacitor 48 to the junction between input resistor 22 and feedback resistor 36. Thus this reset capacitor is maintained charged to a level corresponding to the difference between the deviation signal on terminal 10 (plus the rate signal, if the condition is changing) and the controller output represented by the voltage on terminal 34. In effect the reset capacitor provides a "memory" of the relationship between the status of the process condition and the actual controller output, so as to enable the controller to be switched back to automatic operation at any time without upsetting the process.

When the transfer switch 72 is returned to "automatic" position, switch section 70b reconnects the reset capacitor 48 to the lower amplifier input terminal 52 and switch section 70a reconnects the other input terminal 24 to the junction between resistors 22 and 36. Since the reset capacitor and this junction were connected together just before switchback to automatic, and hence at exactly the same potential, it will be evident that immediately after switchback the two amplifier input terminals also will be at the same potential. Thus, no significant change in controller output signal will be required to achieve a stable condition, so the transfer back to automatic is effected without any process upset.

It may particularly be noted that transfer to automatic operation will be smooth even if the process condition is changing so as to produce a rate-responsive signal at the output of amplifier 66. This is because the output of amplifier 66 is connected in series with the reset capacitor 48 both before and after switchback to automatic operation. Thus the charge on the reset capacitor will be maintained at the level required to provide, at switchback to automatic, essentially zero potential difference between the amplifier input terminals 24 and 52, regardless of any changes occurring in the controlled process condition at the instant of transfer.

After the transfer to automatic has been accomplished, the controller will act in its normal fashion to regulate the controlled process condition. If the condition deviates from the desired set point, the control signal automatically will change so as to reposition the process valve (or other regulating device) in a manner to bring the controlled condition rapidly and smoothly to the desired set point.

The set point current applied to terminals 10 and 12a is developed by a set point generator generally indicated at 200 in FIGURE 2. This generator includes a full-wave rectifier 202 the D-C output of which passes through an RC filter 204 to a Zener voltage-regulating diode 206. The voltage fixed by this diode is connected across the main current-carrying circuit of the set point generator, this circuit consisting of a fixed resistor 208, an adjustable "span" resistor 210, the emitter and collector electrodes of the output transistor 212, the set point terminals 10 and 12a, and a fixed resistor 214 (100 ohms) providing a readout voltage for a remote indicator or other control purposes.

The magnitude of the current flowing through the transistor 212 is adjusted by a set point potentiometer 216 the movable arm of which picks off a control voltage for the base electrode of the transistor. This potentiometer is supplied with current by a "zero" adjusting resistor 218 and a fixed resistor 220 which are connected to a second Zener regulating diode 222. This latter diode is energized through a pair of compensating diodes 224 and a fixed resistor 226 connected to the first Zener diode 206. Diode 222 provides a very closely regulated voltage for setting the potential on the transistor base electrode.

One advantage of this set point generator 200 is its ease of calibration relative to comparable circuits available before. To calibrate, set point potentiometer 216 first is placed at its low output position and the zero resistor 218 is adjusted to provide a current output through the transistor 212 of 2 milliamps. Then potentiometer 216 is placed at its high output position and the span resistor 210 is adjusted to provide a transistor output current of 10 milliamps. Readjustment of the zero and span resistors may be necessary in order to reach precise settings of 2 and 10 milliamps, but in any event the entire calibration procedure is quickly accomplished. It may also be noted that with this arrangement the set point potentiometer 216 need not be of the type having a closely controlled resistance, since the calibration adjustments compensate for any inaccuracy in the actual value of resistance. The only requirement is that the change in resistance with changes in potentiometer setting be uniform and consistent.

The cascade switch 100 serves, when actuated, to connect a remotely controllable set point signal to the controller, for example a set point signal derived from the output of a similar controller responsive to a second condition of the process. This remote set point signal is applied to terminals 180 and 182 to cause a corresponding flow of current (e.g. in the range of 10 to 50 milliamps) through a resistor 184 (100 ohms). The resulting voltage signal is applied through a compensating resistor 186 (400 ohms) and the cascade switch 100 to sections 102a and 102b of the reversing switch 104. Accordingly, the set signal developed across resistor 184 is connected in series opposition to the measurement signal developed across resistor 18. The ohmic resistance of resistors 184 and 186 is made equal to that of resistor 16, in order to assure that the deviation meter 156 provides an accurate indication of the value of the deviation signal.

The reversing switch 104 operates in the usual way to reverse the direction of the controller output signal for a given change in either the measurement or set signal. That is, in one position of this switch, an increase in the measurement current will cause the potential of output terminal 34 to go more negative, whereas with the reversing switch in its other position, an increase in measurement current will cause the potential of output terminal 34 to go more positive.

Referring now to FIGURE 4, when the controller is on automatic operation, amplifier input signal is directed through conductors 106 and 124 and section 70a of transfer switch 72 to the amplifier input terminals 24 and 52. From there, the input signal passes through a T-filter network 300 and one winding 302 of a transformer 304 to a pair of semiconductor diodes 306 and 308. These diodes, which may actually be transistors connected as diodes, operate in the non-conducting region of their characteristic curve, and provide an electrical capacitance the value of which corresponds to the magnitude of the applied voltage.

The general nature of the operation of the diodes 306 and 308 in controlling the amplifier 26 is explained in U.S. Patent No. 2,956,234 issued to E. O. Olsen. Briefly, these diodes form part of a variable attenuation network in an oscillating positive feedback circuit around the amplifier 26, and control the amount of attenuation in such a way as to adjust the amplitude of oscillations to a level corresponding to the applied D-C input signal. This capacity-diode arrangement is particularly advantageous because it provides an extremely high input impedance for the amplifier 26, and this in turn furnishes a number of significant benefits in the design and operation of the controller.

The oscillations developed in the amplifier 26 are tuned by a resonant circuit 310, for example to a frequency of 130 kilocycles. The oscillations in this circuit are coupled by the transformer 312 to the input of a two-stage direct-coupled transistor amplifying unit 314. Each of the transistors of this unit is supplied with operating power through respective load resistors 316 and 318 connected to a D-C power lead 320. This lead in turn is connected through a voltage-dropping resistor 322 to the positive terminal 324 of a 65 volt power supply 325 (see FIGURE 2) having a negative terminal 326.

The A-C output of amplifying unit 314 is coupled through a capacitor 328 to the input of another two-stage direct-coupled transistor amplifying unit 330. The first transistor of this unit is supplied with D-C power through a load resistor 332, while the second transistor is supplied with power through a load resistor 334 and two series-connected coupling circuits 336 and 338. The first of these circuits 336 includes primary winding 340 of a transformer 342 the secondary winding 344 of which furnishes a signal to a power amplifier stage 346. Coupling circuit 336 includes a tuning capacitor and loading resistor which function in the usual way. The other coupling circuit 338 includes primary winding 348 of a transformer 350 the secondary 352 of which is connected to a pair of positive feedback leads 354. This coupling circuit 338 includes a tuning capacitor and loading resistor, and also includes a pair of reverse-connected diodes 356 which serve to limit the amplitude of the positive feedback signal to provide improved stability characteristics.

Positive feedback leads 354 transmit the A-C feedback signal to the primary winding of transformer 304 in the amplifier input circuit previously described. The other winding 302 of this transformer includes a pair of intermediate taps 360 and 362 leading to a balance adjustment potentiometer 364 the movable arm of which is connected to transformer 312 to complete the A-C input circuit. When there is no signal on the amplifier D-C input terminals 24 and 52, the diodes 306 and 308 will have equal capacitance, and for this condition the potentiometer 364 is adjusted to unbalance the A-C input circuit sufficiently to cause the amplifier to oscillate with an amplitude mid-way between the limits of the design range of amplitude variations. When a D-C input signal is applied to terminals 24 and 52, the capacitance of diodes 306 and 308 will become unbalanced, and the oscillations will increase or decrease in amplitude, depending upon the polarity of the applied D-C input signal.

The power amplifier 346 includes two transistors 366 and 368 the base electrodes of which are connected to respective ends of transformer winding 344 so as to activate the two transistors alternately. The collectors of these transistors are connected to respective ends of a winding 370 of an output transformer 372. The center tap 374 of this winding is connected to the negative output terminal 376 of the controller. The positive output terminal 378 of the controller is connected through an output meter 380 to the power supply terminal 324. The controller load connected between output terminals 376 and 378 may consist of one or several units of various types, and the total ohmic resistance of this load may vary up to about 600 ohms.

The path of the controller output load circuit can be traced from power supply terminal 324 through the output meter 380 and the controller load (not shown), through one or the other of the two halves of transformer winding 370, through transistor 366 or 368, through resistors 382 or 384, and through a series resistor 386 (100 ohms) to the negative power supply terminal 326. Transistors 366 and 368 conduct current alternately in this load circuit and the magnitude of the D-C current flow corresponds to the amplitude of the A-C signal coupled to these transistors by transformer 342.

Experience has indicated the need to limit the magnitude of the controller output current with respect both to its minimum and maximum magnitudes. For some applications, it is desirable to limit the controller output to its normal intended operating range, but for other applications (such as where the controller is being used to provide a cascade set point signal for another controller) it may be desired to limit the controller output to a smaller range, for example, from 25% to 75% of its normal range. Accordingly, the output limiting means should be adjustable. Moreover, it has been found that the limiting means should be arranged to hold the output current, as distinct from the output voltage, within a desired range, because the output load may be anything up to 600 ohms, and voltage limiting would give different results for different loads. These features are provided by the circuit elements now to be described.

Connected in parallel with output transistor 366 and its resistor 382 is another transistor 388 the base of which is held at a fixed (but adjustable) potential by a biasing network 390. This network includes a Zener regulating diode 392 which is energized through a dropping resistor 394 by the power supply terminals 324 and 326. The potential supplied to transistor 388 is such as normally to prevent conduction therethrough. However, if the controller output current falls to a predetermined low limit (e.g., 10 milliamps) where the potential developed by series resistor 386 is less than the potential of the base of transistor 388, this transistor will start to conduct. The current through this transistor by-passes power transistor 366, and supplies to the controller load sufficient current to prevent the total load current from falling below the predetermined lower limit.

For the upper limit, another transistor 396 is connected between the base of power transistor 368 and the negative power supply terminal 326. The base of transistor 396 is furnished with a fixed (but adjustable) potential from network 390. With this arrangement, if the load current through series resistor 386 reaches a predetermined upper limit (such as 50 milliamps) conduction will start through the emitter-collector circuit of transistor 396. This conduction will occur only at alternate peaks of the A-C output signal at transformer 342, and tends to clip these peaks so as to lessen the drive applied to transistor 368. This clipping can be considered as resulting from the effective internal impedance of the transformer 342, for example due to saturation of the transformer, or voltage drop across the internal winding resistance. In any event, the effect is to hold the output load current to the predetermined maximum limit. If desired, the emitter of transistor 396 can be energized from both ends of transformer winding 344, with suitable diode isolation (not shown) in each lead, in order to provide full-wave operation of transistor 396 and consequent limiting at both output transistors 366 and 368.

The feedback circuitry described with reference to FIGURE 3 is energized by the secondary 398 of transformer 372. The A-C signal on this secondary is directed to a full-wave rectifier circuit 400 which furnishes a direct current to the leads 28 and 30 to provide the desired D-C energization of the feedback circuitry. It will be evident that this direct current will correspond in magnitude to the output current through controller terminals 376 and 378.

Although a preferred embodiment of this invention has been described in detail, it is desired to emphasize that this is intended only as illustrative of the invention and not as limiting the scope thereof; modified forms of the invention will be apparent to those skilled in the art.

What is claimed is:

1. Process control apparatus for producing a control signal for a process regulating device, comprising: comparison circuit means having first and second output terminals between which is developed an electrical deviation signal representing the difference between a measured process condition and the desired value thereof; an amplifier having two differential input terminals the potential difference between which determines the amplifier output; first means coupling one terminal of said comparison circuit means to one of said input terminals; feedback means under the control of said amplifier output and arranged to develop a feedback signal; said first means including means coupling a portion of said feedback signal to said one input terminal to tend to oppose changes in the potential thereof resulting from changes in said deviation signal; a reset circuit coupled to said feedback means and having a resistor and a capacitor connected in series to produce a capacitor voltage which responds relatively slowly to changes in said feedback signal; and second means coupling said capacitor betwen the second comparison circuit output terminal and the second amplifier input terminal so as to develop for the amplifier input a composite signal comprised of the serial combination of said deviation signal and the capacitor voltage, thereby to produce a resultant voltage between the two input terminals of said amplifier responsive both to the effect of said deviation signal and to an augmenting but slowly changing effect of the voltage across said capacitor.

2. Apparatus as claimed in claim 1, including rate-responsive means arranged to receive a measurement signal corresponding to the controlled process variable and to produce a rate signal reflecting the rate-of-change of the process condition, and circuit means arranged to inject said rate signal in series with said reset capacitor.

3. Apparatus as claimed in claim 2, wherein said rate-responsive means includes amplifier means to intensify the rate-responsive signal to a high level relative to said deviation signal.

4. Control apparatus as claimed in claim 1, wherein said first coupling means comprises a resistive network connected between said one comparison circuit terminal and said feedback means to provide a potential intermediate therebetween and responsive to changes in the voltage of either.

5. Control apparatus as claimed in claim 4, wherein said resistive network comprises a voltage-divider the ends of which are energized respectively by said deviation signal and the amplifier output at said feedback means, the intermediate point of said divider being connected to said one input terminal.

6. Control apparatus as claimed in claim 5, wherein said reset circuit is coupled to said feedback means by a second voltage-divider network.

7. Control apparatus as claimed in claim 6, wherein the dividing ratios of said two voltage-dividers are substantially equal.

8. Control apparatus as claimed in claim 7, wherein the series resistor of said reset circuit is connected at one end to the intermediate point of said second voltage-divider and at its other end to the second input terminal of said amplifier, the potential of said two amplifier input terminals thereby being equal when said deviation signal is zero for a time sufficiently long to stabilize the capacitor voltage.

9. Control apparatus as claimed in claim 8, wherein said reset capacitor is connected to second amplifier input terminal.

10. Control apparatus as claimed is claim 9, including rate-signal means coupled between said reset capacitor and the other terminal of said comparison circuit means, to inject a rate-responsive signal through said reset capacitor and into the amplifier input.

11. Control apparatus as claimed in claim 10, wherein said rate signal means is activated directly by the condition measurement signal, whereby the rate component is unaffected by changes in the set point of the controller.

12. Control apparatus as claimed in claim 6, wherein the changes in potential at said feedback means are in a direction opposite to that of the corresponding changes in the deviation signal.

13. Process control apparatus adapted to receive a deviation signal and to produce a control signal for transmission to a load including a remote process regulating device such as a valve, said control apparatus comprising an amplifier having an input and an output, input coupling means for directing a deviation signal to said amplifier input; feedback means coupled between said output and said input, said feedback means including a capacitor to introduce reset action in the control signal, output circuit means for developing an output direct current to serve as the control signal; a current-responsive element in said output circuit to receive therefrom a direct current proportional to said ouput current so as to develop a D-C voltage drop proportional to the output current; first sensing means connected to said current-responsive element to detect when said output current reaches a predetermined upper level; second sensing means connected to said current-responsive element to detect when said output current reaches a predetermined lower level; first limiting means operable with said first sensing means to prevent any further increase in the magnitude of said output current after said predetermined upper level is reached; and second limiting means operable with said second sensing means to prevent any further decrease in the magnitude of said output current after said predetermined lower level has been reached.

14. Apparatus as claimed in claim 13, wherein said current-responsive element comprises an electrical resistance arranged to produce a D-C voltage drop proportional to the flow of current therethrough; supply voltage means providing first and second D-C supply voltages at different predetermined magnitudes; said first sensing means including means to compare said first D-C supply voltage with said D-C voltage drop and to produce an output indication when a predetermined relationship between the two is reached; said second sensing means including means to compare said second D-C supply voltage with said D-C voltage drop and to produce an output indication when a predetermined relationship between the two is reached, said first and second limiting means being responsive respectively to the output indications produced by said first and second sensing means.

15. Apparatus as claimed in claim 14 wherein said first and second sensing means include respective transistors biased by said first and second D-C supply voltages and arranged to initiate conduction when said D-C voltage drop reaches its upper and lower levels respectively.

16. Apparatus as claimed in claim 15, wherein said first transistor is connected in the amplifier output circuit and arranged when made conductive to by-pass a portion of the amplifier output signal to prevent any further increase in said output current.

17. Apparatus as claimed in claim 15, wherein said second transistor is connected across the amplifier output circuit and arranged when made conductive to by-pass a small amount of current from the amplifier power supply around said amplifier output circuit and into said load, the amount of current so by-passed being sufficient to prevent the total output current from dropping below said predetermined lower level.

18. In process control apparatus of the type comprising measurement signal means responsive to a D-C measurement current reflecting the value of a process condition and adapted to produce a corresponding measurement signal, set signal means responsive to a D-C set current representing the desired value of the process condition and adapted to produce a corresponding D-C set signal, comparison circuit means interconnecting said measurement and set signal means to provide a deviation signal indicating the difference between the measured and desired values of the process condition, amplifier means having an input connected to said comparison circuit means to receive said deviation signal, said amplifier being arranged to produce an output control signal adapted for transmission to a process regulating device; that improvement in said apparatus which consists of means for generating said set current and comprising an amplifying device, a D-C power supply for said amplifying device, first circuit means providing a series circuit connecting said D-C power supply in series with said set signal means and the output of said amplifying device, the input to said amplifying device controlling the magnitude of current flowing from said D-C power supply through said set signal means; an adjustable resistance connected in said series circuit for calibrating the span of the apparatus; second circuit means connected to said power supply means to provide an adjustable input signal for said amplifying device; a first variable element in said second circuit means providing an adjustment of the magnitude of said input signal to alter said set point signal through its full normal range of variation; and a second variable element in said second circuit means providing an adjustment of the current flowing from said D-C power supply in said second circuit means for calibrating the zero setting of said apparatus.

19. Apparatus as claimed in claim 18, wherein said second circuit means comprises a series circuit including said first and second variable elements; said first variable element comprising a potentiometer the movable arm of which is connected to the input of said amplifying device; said second variable element comprising a variable resistance in series with said potentiometer to adjust the current flowing therethrough.

References Cited

UNITED STATES PATENTS

| | | | |
|---|---|---|---|
| 2,850,650 | 9/1958 | Meacham | 307—237 |
| 2,857,562 | 10/1958 | Umrath | 330—9 |
| 2,906,941 | 9/1959 | Brolin | 307—296 |
| 2,909,620 | 10/1959 | Graef | 330—103 |
| 2,956,234 | 10/1960 | Olsen | 330—10 |
| 3,069,618 | 12/1962 | Pfaff | 307—237 |
| 3,124,743 | 3/1964 | Riseman | 330—9 |
| 3,167,718 | 1/1965 | Davis | 330—9 |
| 3,237,116 | 2/1966 | Skinner | 307—234 |
| 3,349,321 | 10/1967 | Arksey | 330—9 |

ARTHUR GAUSS, Primary Examiner

H. A. DIXON, Assistant Examiner

U.S. Cl. X.R.

330—30

UNITED STATES PATENT OFFICE
CERTIFICATE OF CORRECTION

Patent No. 3,467,874                        September 16, 1969

David A. Richardson et al.

It is certified that error appears in the above identified patent and that said Letters Patent are hereby corrected as shown below:

Column 14, after line 23, insert the following claim:
    20. Apparatus as claimed in claim 6, including a potentiometer in the output circuit of said amplifier, said two voltage dividers being connected to the movable arm of said potentiometer to permit adjustment of the proportioning band of the control apparatus.

In the heading to the printed specification, line 9, "19 Claims" should read -- 20 Claims --.

Signed and sealed this 11th day of August 1970.

(SEAL)
Attest:

Edward M. Fletcher, Jr.                  WILLIAM E. SCHUYLER, JR.

Attesting Officer                       Commissioner of Patents